3,149,231
INFRARED TARGET DETECTION USING ATMOSPHERIC FILTER TO REMOVE SOLAR RADIATION ABOVE 4 MICRONS WAVELENGTH
Leonard E. Ravich, Brookline, Mass., assignor to Hupp Corporation, Cleveland, Ohio, a corporation of Virginia
Original application Oct. 30, 1953, Ser. No. 389,228, now Patent No. 2,939,938, dated June 7, 1960. Divided and this application Mar. 7, 1960, Ser. No. 13,147
4 Claims. (Cl. 250—83.3)

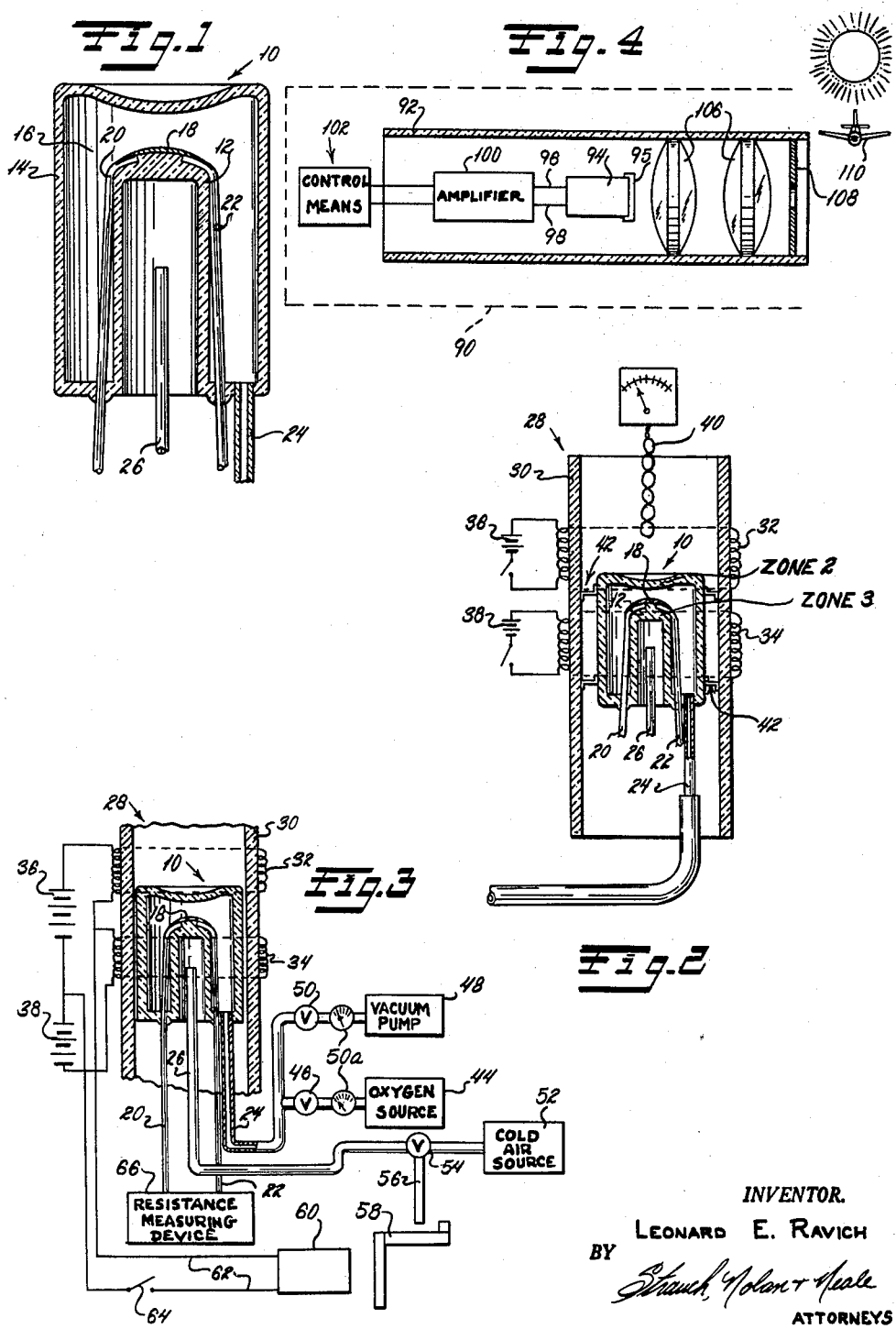

This invention relates to improvements in the application and use of an infrared responsive cell. This application is a division of my co-pending application Serial No. 389,228, filed October 30, 1953, now patent No. 2,939,938.

It is an object of this invention to provide a guided missile with a new and useful means for detecting the presence of infrared rays emitted by an aircraft or the like body.

Another object is to provide a novel system and method of detecting infrared radiation from non-solar objects by excluding interference radiation from the sun.

Other objects of this invention will become apparent from the claims, and from the following description in conjunction with the accompanying drawings in which:

FIGURE 1 is a sectional view of a photocell at one step in its manufacture;

FIGURE 2 is a plan view of an electric oven, and shows heating zones and a photosensitive cell in the heating zones;

FIGURE 3 is a diagrammatic showing of the electric oven and connections from the photosensitive cell to various services; and FIGURE 4 is a diagrammatic showing of a missile and a photosensitive cell.

A photosensitive cell 10, FIGURE 1, comprises a thimble 12, in an envelope 14, to define an inner chamber 16. Seated on the upper end of the thimble is the radiation responsive layer 18, of lead sulfide, which is connected to two wires 20 and 22. A capillary tube 24, enters the chamber to carry the lead sulfide into the cell, and to connect the chamber to a source of oxygen or to a vacuum pump. A second pipe 26, carries cold air into the thimble to quickly cool the seat upon which the lead sulfide is resting in the completed cell.

During the process of making the cell 10, as described in Patent No. 2,884,345 issued to Rocard et al., active material is entered into the cell into zone 1, then heated to sublime the material to cause it to become deposited in zone 2, and again heated to finally cause it to become deposited in zone 3, in contact with the wires 20 and 22.

The cell 10 is advantageously placed in an electric oven 28, which has a wall of transparent material 30, and a pair of coils of wire to define heating means 32 and 34. The wires are suitably connected to power sources indicated by batteries 36 and 38. Conventional means may be employed to maintain the coils at the proper temperature such as a thermocouple 40 which indicates the temperature of the interior of the tube. Suitable means, indicated generally at 42, support the cell centrally of oven 28 and permit longitudinal movement therein.

In FIGURE 3, the cell is shown with its tube 24, selectively connectable to a source of oxygen 44 through a valve 46, or to a vacuum pump 48 through a valve 50. The pipe 26 is connected to a source of cold air 52 through a valve 54, and the valve 54 is provided with an arm 56 which engages an armature 58 so that the cold air cannot be placed in the thimble while the heating wires are energized. The armature is controlled by an electromagnet 60 provided with lead wires 62, and a switch 64 is also connected in this circuit.

The wires 20 and 22 are connected to a resistance measuring device 66, so that the resistance of the layer 18 may be determined.

In FIGURE 4 there is shown a detector system on a guided missile in accordance with the present invention for detecting the presence of an airplane so that the missile may be guided to "home" on the airplane or explode at the proper moment. In this figure, a guided missile 90 carries a tube 92 in which is placed an infrared responsive cell 94, such as a lead sulphide, lead telluride or lead selenide cell, coupled by its wires 96 and 98 through a conventional amplifier 100 to control means indicated generally at 102. For day light use, means are provided to control or obscure the light from the sun 104 entering the interior of the tube 92 to prevent interference by solar radiation with the reception of infrared radiation from aircraft 110. Such means may take the form of a filter 108 placed in front of the lenses 106. Filter 108 is so constructed as to eliminate all solar radiation below 4 microns. The carbon dioxide in the earth's atmosphere exerts a filtering effect on all solar radiation above about 4 microns so that such a filter placed in front of the infrared responsive cell 94 only allows transmission of radiation above 4 microns admitted at relatively close proximity to the guided missile.

In order to utilize the lead sulphide cell during day light operation in the above described manner, it is necessary that the lead sulphide cell be cooled with carbon dioxide snow or liquid air so that it will have a sensitivity above 4 microns. A lead selenide cell does not require such cooling for its operation. The lead telluride cell will operate satisfactorily only at the temperature of liquid air ($-180°$ C.). For night time operation the lead selenide or cooled lead telluride cell will operate satisfactorily without the filter 108.

The airplane indicated generally at 110 is illustrative of an object to be detected. Chopper means, indicated generally at 95, is used to interrupt the incoming infra-red radiation from a detected plane so that the sensitivity of the infrared cell detection unit is at its optimum. A chopping frequency of 8000 cycles per second for the lead sulphide cell and 2000 cycles per second for the lead telluride or lead selenide cells is recommended.

To a guided missile carrying the cell 94, the sun is a source of constant intensity infrared rays because of the great distance between the sun and the missile. On the other hand, the intensity of the rays received by the cell as it approaches a heated body will increase very rapidly because of the decreasing distance between missile and the heated body and because the intensity increases as the inverse square of the distance. The derivative or rate of increase of the infrared radiation received may be utilized in electrical circuits on the missile in association with the control circuits, but the output of the amplifier may not exactly follow the inverse of the square of the distance because of the shape of the response curve of the cell 94. However, we do have the condition of a first constant intensity source of infrared rays for all practical purposes at a great distance from the sun, and of another source, the intensity of which seems to increase rapidly as the missile approaches the aeroplane.

There is no significant Doppler effect in relation to the sun where the detector is travelling in a direction other than toward or away from the sun, but the relation of the Doppler effect between the aeroplane and the detector containing cell 94, is quite significant since in practice the detectors would be moving toward thhe aircraft. Since the cell is a frequency responsive device under certain temperature conditions and with a particular selected responsive material, a useful response curve may be obtained to get a desired change in response to take advantage of the Doppler effect. Thus, it is possible to discriminate between energy from a constant source, such as the sun, and energy which appears to increase in intensity according to the inverse square of distance law, and with a change of frequency, as the missile approaches the heated and relatively proximate second source.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. The method of detectively differentiating between a body emitting infrared radiation at least some of which is above 4 microns in wavelength in the earth's atmosphere and infrared solar radiation by utilizing a single infrared sensitive cell in conjunction with an optical system comprising the steps of:
   (a) filtering by means of said optical system substantially all radiation shorter than about 4 microns in wavelength which are directed toward said cell regardless of the source thereof,
   (b) atmosphere filtering influential amounts of said solar infrared radiation to which the cell is responsive at wavelengths longer than about 4 microns, and
   (c) passing at least some of said infrared radiation above 4 microns emitted by said body through said optical system to said cell to provide an output signal therefrom responsive to said body emitted radiation.

2. The method as defined in claim 1 further including the steps of interrupting said radiation directed to said cell at a frequency in the order of 2000 to 8000 cycles per second to optimize the sensitivity of said cells.

3. In an atmospheric system for detecting a moving body having a power plant exhaust emitting infrared radiation above about 4 microns in wavelength by differentiating said exhaust radiation from solar infrared radiation comprising:
   (a) a single infrared cell responsive to radiation above and below about 4 microns;
   (b) an atmosphere filter encompassing said moving body whereby an immaterial amount of said exhaust radiation above about 4 microns is suppressed and whereby a material amount of said solar radiation above about 4 microns is suppressed remote from said cell;
   (c) filter means substantially opaque to infrared radiation below about 4 microns regardless of the source; and
   (d) optical means for directing infrared radiation above about 4 microns penetrating said atmosphere filter to said cell through a path which includes said filter means whereby the cell responds primarily to said exhaust radiation.

4. In a system for detectively differentiating between a moving body emitting infrared radiation in the earth's atmosphere at least some of which is above 4 microns in wavelength and infrared solar radiation comprising: an infrared cell responsive to radiation above and below 4 microns; filter means substantially opaque to infrared radiation below about 4 microns; and optical means for directing infrared radiation to said cell through a path including said filter means, whereby the cell is predominately responsive to said body radiation longer than about 4 microns in wavelength consequential of atmosphere filtering of substantial amounts of said solar radiation longer than about 4 microns in wavelength.

References Cited in the file of this patent
UNITED STATES PATENTS

| | | |
|---|---|---|
| 2,544,261 | Gibson | Mar. 6, 1951 |
| 2,816,232 | Burstein | Dec. 10, 1957 |
| 2,826,703 | Bemis | Mar. 11, 1958 |
| 2,855,521 | Blackstone | Oct. 7, 1958 |
| 2,856,540 | Warshaw | Oct. 14, 1958 |
| 2,884,345 | Rocard et al. | Apr. 28, 1959 |
| 2,927,212 | Shimukonis | Mar. 1, 1960 |
| 2,953,529 | Schultz | Sept. 20, 1960 |